Oct. 2, 1962  M. M. V. GLAUDE ETAL  3,056,886
RADON DETECTOR
Filed Sept. 12, 1957  2 Sheets-Sheet 1
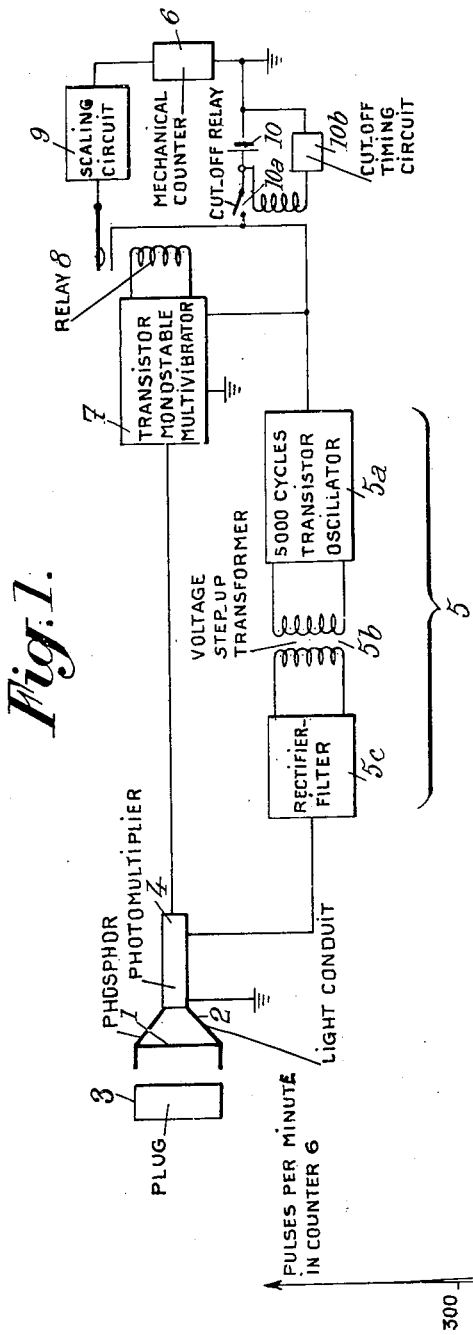
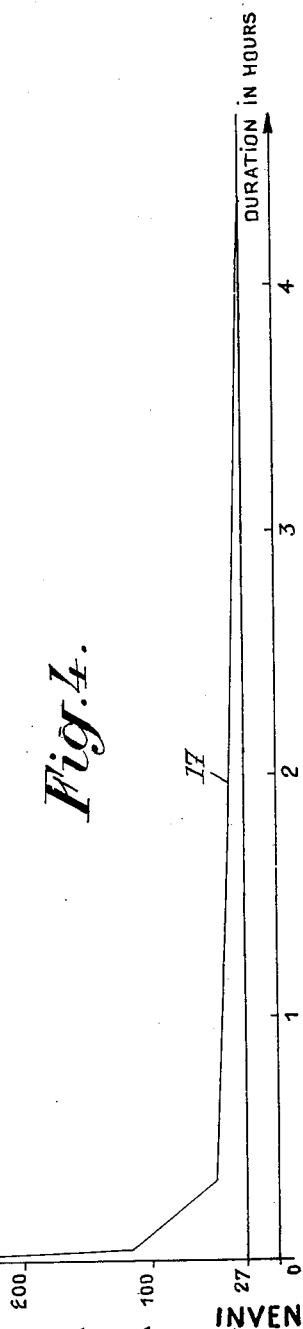
INVENTORS:
MAX MARIE VITAL GLAUDE
and DANIEL BOCLET
BY
Att.

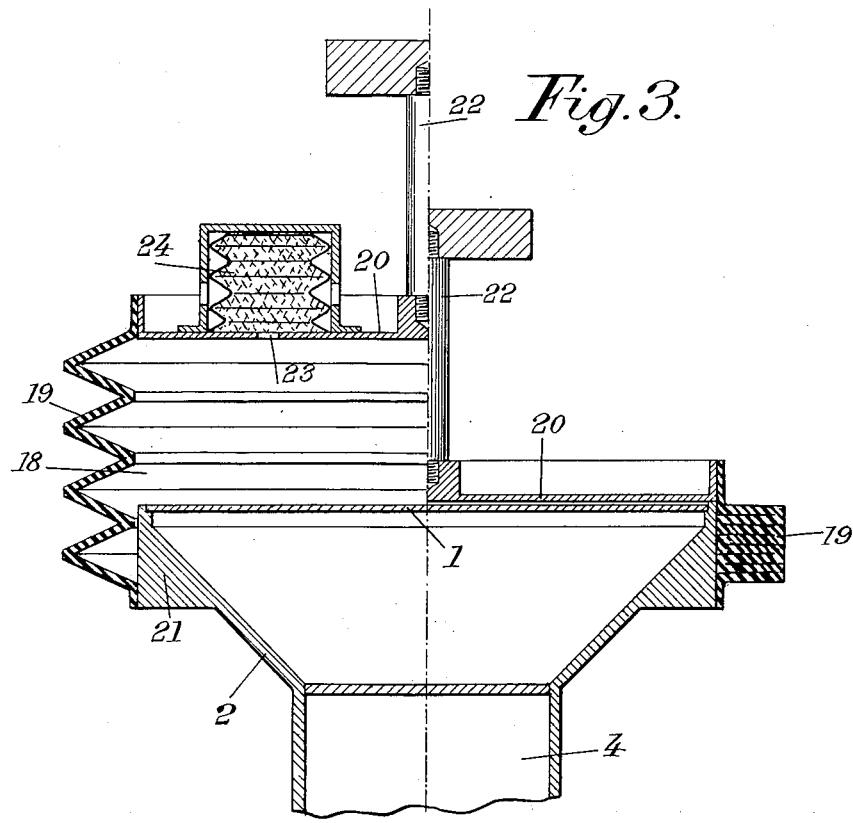
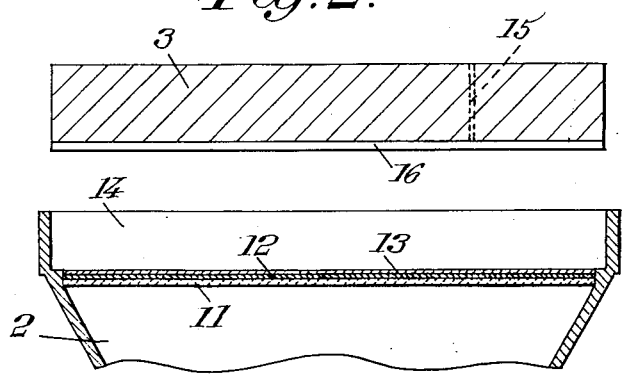

United States Patent Office 3,056,886
Patented Oct. 2, 1962

3,056,886
RADON DETECTOR
Max Marie Vital Glaude, Paris, and Daniel Boclet, Orsay, France, assignors to Commissariat a l'Energie Atomique, Paris, France, a French state administration
Filed Sept. 12, 1957, Ser. No. 683,639
Claims priority, application France Sept. 14, 1956
5 Claims. (Cl. 250—71.5)

This invention relates to apparatus for determining the content of radon in an atmosphere, and in particular in spots in which this content may be high, as for example in uranium mines.

A primary object of this invention is to provide an autonomous and portable apparatus of this type which is adapted to indicate the radon content of the surrounding atmosphere quasi-instantaneously and on the spot.

It is to be recalled that the surrounding atmosphere normally contains a certain amount of radon, i.e. of the order of $10^{-10}$ curies per cubic liter of air over ground. The radon content of the air may, however, be much higher and may even reach a dangerous level in certain zones, such as laboratories in which radium salts are handled, uranium storing zones, mineral treating plants, uranium mines, and so on. The generally-tolerable dose for the human organism is $10^{-10}$ curies of radon per liter of aspirated air. In uranium mines, in particular, this tolerable dose is often exceeded, and it is therefore important, having regard to the very unhealthy physiological effects of this gas, to check most frequently the radio activity of the air in the galleries of the uranium mines to avoid dangerous concentrations of radon.

The methods hitherto employed to measure the radon content of the air are as follows:

The collection of a sample of the gas to be analyzed, the introduction thereof into an apparatus adapted for counting the individual alpha particles emitted by the radon during the radioactive decay thereof (such apparatus being a proportional counter, a spark counter, or a pulse ionization chamber), or into an ionization chamber adapted to furnish an ionization current, the means value of which is a function of the number of said particles. A second method includes the absorption of the radon by a body of activated carbon and then the counting with a Geiger counter of the beta particles emitted by radium C (which is a decay product of radon) in the body of activated carbon.

Unfortunately, however, none of these methods gives a quick indication of the quantity of radon present in the air to be analyzed since, in every case, the gaseous sample has to be collected and the actual measurement must be performed in the laboratory, the apparatus used being heavy and delicate to handle. In mines, in particular, for picking-up a gaseous sample it is necessary to lower empty receptacles or cartridges of activated carbon into the gallery to be checked, and then to bring these receptacles or cartridges up again to the surface and send them immediately to the laboratory where the analysis is to be performed. It is quite obvious that this method is lengthy and inconvenient.

The invention has therefore as an object a portable detecting apparatus for determining the radon content of an atmosphere, comprising a variable-volume chamber, including a stationary wall formed by a detecting element capable of emitting light scintillations in response to alpha particles, the other walls of the chamber being photon-opaque, said chamber being adapted to receive, when operated, a predetermined volume of said atmosphere; means for reducing the volume of said chamber substantially to zero to exhaust substantially completely said volume; photomultiplier means transforming the scintillations of said detecting element in detectable electron bursts; transistorized electronical means for supplying said photomultiplier means with electric power and for transforming said electron bursts thereof in electric pulses; means for counting said pulses; and means for limiting said counting to a predetermined duration.

Such an apparatus may be kept permanently underground in a mine where it indicates, in situ, the radon content of the atmosphere; it is, in this instance, devised so as to have the usual characteristics of a prospection apparatus: it is self-contained and its weight does not exceed 10 kilograms. In this essentially practical form it can be very useful, particularly in all the plants or mines in which uraniferous ores are treated or extracted.

There will now be described, with reference to the diagrammatic FIGURES 1 to 4 herewith, a non-limiting example of a radon detector in accordance with this invention. The embodiments which will be described hereafter in reference to this example are to be considered as forming part of the present invention, having regard to the fact that all equivalent arrangements may be used without departing from the purview of the invention.

FIGURE 1 is a block-diagram showing the alpha particle detecting device of the radon detector forming the subject of this invention.

FIGURE 2 is an axial section through the detecting end of the device according to FIGURE 1.

FIGURE 3 is an axial section through the detecting end of a radon detector according to the invention, equipped with a completely callapsible chamber, the left hand part of the FIGURE indicating the shape of this chamber in expanded condition when the apparatus is in use, and the right hand portion of the FIGURE corresponding to the rest position of the apparatus with the collapsed chamber.

FIGURE 4 is a graphic illustration of an example of the response of a radon detector constructed in accordance with the invention.

Referring to FIGURE 1, the reference numeral 1 designates a detecting surface which is sensitive to alpha particles: this surface is exposed to the atmosphere the radon content of which is to be determined. In a preferred embodiment of the invention, this surface is presented by a plate of methyl methacrylate (which material is known under the commercial name "Plexiglas"), covered with a thin layer of zinc sulphide constituting the "phosphor." It will be understood, however, that some other scintillating element, sensitive to alpha particles, may be used within the scope of this invention.

This sensitive surface 1 is protected against parasitic photons, so that it is only sensitized by alpha particles. This result may advantageously be brought about by covering the surface 1 by a metallic film or sheet, for example of aluminium.

To adapt this surface 1 to the smaller photo-cathode of a photo-multiplier tube, use is made of a light conduit 2 formed by a hollow metallic frustum of a cone, for example of the alloy known under the name Duralumin, which concentrates the photons emitted by said surface 1 onto the said photo-cathode.

Means, such as a plug 3, may be provided for eliminating, at will, before a new measurement, the volume of air in front of surface 1.

The electronic equipment of the apparatus, equipment which is conventional, is chosen so as to have a minimum bulk and weight, to be self-contained and to render said apparatus capable of more than e.g. ten hours continuous operation.

In the example under description, this electronic equipment comprises:

(a) a low voltage battery 10 delivering a continuous current of 10 ma. of 12 volts and with a capacity of 4 ampere-hours.

(b) an assembly 5 regulated to 1.5%, adapted to develop a continuous current of 120 μa. at 1800 volts to feed the photo-multiplier 4, this unit comprising a transistor oscillator 5a (for example of the type described in "Electronic and Radio Engineering" by Frederick E. Terman—McGraw Hill, 4th edition 1955, page 795) fed by the battery 10 and such that an alternating voltage of 12 volts at a frequency of 5000 cycles/second can be tapped from the outlet thereof, a voltage stepup transformer 5b producing an alternating voltage of 1800 volts from the said alternating voltage of 12 volts, and a suitable conventional rectifier-filter unit 5c (for example of the type described in the above-mentioned "Electronic and Radio Engineering" on pages 703 to 708 and 721 to 739 respectively), the photomultiplier 4 thus fed giving pulses of 10 to 30 volts amplitude and 50 μs. period when it operates under no load.

(c) a mono-stable circuit formed by a transistor mono-vibrator 7 (e.g. of the type described in the above "Electronic and Radio Engineering" on pages 795 and 796) governed by said pulses delivered by the photo-multiplier 4, fead by the battery 10, and adapted to deliver signals which are well defined in amplitude (12 volts) and in duration (12 μs.).

(d) a scaling circuit 9 of the type generally used with scintillation counters (see e.g. James M. Cork "Radioactivity and Nuclear Physics," Van Nostrand Co. third edition, pages 71 and 72) comprising a switch controlled by a relay 8 operated by the aforesaid signals when each of these signals is imparted by the mono-stable circuit 7, this scaling circuit 9 being likewise fed by said battery 10 and delivering in a mechanical counter 6 directly graduated in radon content.

For a mean counting rate 20 pulses per second, the capacity of the apparatus is about 320 ma.

In addition, a cut-off system (comprising a cut-off relay 10a controlled by a conventional cut-off timing circuit 10b) is provided for limiting the period of measurement to a precise duration, preferably between 30 and 60 seconds, the battery 10 being open-circuited after each measurement.

Each time the sensitive surface 1 is exposed to the atmosphere, there is a deposit thereon of radio-active products, the period of which is such that the interval between two measurements must be at least 20 minutes if a 10% precision is required.

The radon dose is directly given by a reading of the number indicated by the counter 6, that is to say the number of pulses occurring during the measuring period.

FIGURE 2 illustrates a detail of the structure of the sensitive surface 1 and of the light conduit 2. The sensitive surface 1 comprises a plate of methyl methacrylate (Plexiglas) 11 which is covered with a layer 12 of zinc sulphide and externally with thin sheet or sheets of aluminium 13 protecting the sensitive layer 12 against parasitic photons.

This layer, having a surface area of 100 square centimeters, is the vital element of the whole apparatus, since it detects the alpha particles emitted by the radon atoms or by the active decay products thereof The most fragile part of this first assembly is the aluminium sheet 13. To protect it, the light conduit 2 forms a small space 14 in front of the plate 11 and said space may be completely filled by a plug 3 of sponge rubber or similar material rigid with a cover (not shown).

This plug 3 is fitted manually in said space 14 of conduit 2 after each measurement and fulfils two functions, i.e. first, as above mentioned to protect the aluminium sheet 13, and secondly to leave as small a volume of air as possible in front of the sensitive surface 1 when, after the measurement has taken place, the cover is put back. If this latter precaution is not taken, a residue of radon will remain inside the apparatus and any subsequent measurement will be falsified, for example when checking the aeration of a mine gallery in which there previously existed several tolerable doses. This sponge rubber plug 3 is, moreover, pierced by a plurality of small holes for preventing the suction effect which would otherwise be prejudicial to the aluminium layer 13 each time this plug is placed on, or withdrawn from, the layer. One of these holes has been indicated at 15 in FIGURE 2. After a certain period, the rubber plug 3 will absorb radon, which increases the ground noise of the apparatus. To avoid this drawback, a thin layer of plastic material 16 may be applied to the plug 3.

Generally speaking, with the object of isolating the detecting surface from the fluid to be studied and contaminated to a greater or lesser degree by radon, when the apparatus is not in use, so as to eliminate any risk of systematic involuntary measuring error, a chamber adapted to contain the aforesaid fluid is arranged in front of said surface, this chamber being so devised that its volume can be readily reduced substantially to zero.

To this end it is advantageous to form the said chamber by a bellows of a flexible material which is impermeable to radon, and which is sealed at one end thereof on the mount of said surface, and at its other end on an element adapted to be applied in substantially contiguous fashion onto said surface (or onto the protective aluminium sheet transparent to alpha particles), at least one opening being provided in said element to enable the fluid to pass from the interior to the exterior of said chamber, preferably through a dust filter.

In FIGURE 3, 18 designates a chamber of this character formed by a bellows 19 of flexible material, which is impermeable to air and to light, thereby preventing the parasitic photons to hit the phosphor, and does not absorb radon, such as chlorinated butadiene, known under the commercial name "Neoprene."

The bellows 19 is sealed on a disc 20, which is maintained parallel to the surface 1 and adapted to be applied in substantially contiguous fashion against said surface (or against one of the transparent sheets to alpha particles), and on the other hand against the flared end part of the light conduit 2, along an external part 21 of this conduit, which is spaced from the surface 1 so that, when the bellows 19 is in its folded condition, all the superposed pleats thereof may be housed between said part and said surface, thus allowing for the substantial contiguous application, referred to above, of the disc 20 to the surface 1. It is to be noted that the folds of the bellows are designed in such a way that when they are closed against one another no dead space is left between them in which air may be trapped.

In addition, a handle 22 is mounted on the disc 20 to facilitate actuation of the bellows 19 from the expanded to the collapsed position and vice versa.

At least one opening 23 is, of course, provided in the walls of the chamber 18 to enable a given volume of air to be tested, to be introduced into this chamber, and to be expelled from the latter when its volume is reduced.

Preferably, a filter 24 is arranged opposite this opening and is adapted to prevent the penetration into the chamber of solid or gaseous impurities contained in the external atmosphere.

A filter of this character is advantageously made of pleated or corrugated paper.

Finally a sleeve (not shown) is provided for the mechanical protection of the bellows and, if desired, for guiding disc 20 parallelly to surface 1 during its sliding movement.

The system illustrated in FIGURE 3 operates as follows:

In the open or expanded position of the radon detector, i.e. that shown at the left hand side of the figure, the detecting surface 1 (or the elements protecting the same), the bellows 19, and the disc 20 define a chamber 18 in front of said surface 1. If the air in this chamber contains radon, the disintegrations of the latter will be counted by the apparatus described above and constituted by the scintillator, the photo-multiplier and the transistorized members associated therewith.

If the handle 22 is operated to bring the disc 20 against the surface 1, the air which was previously contained in the chamber 18 is scavenged through the filter 24.

When the disc 20 is brought substantially flush against the surface 1, as at the right hand side of FIGURE 3, there is practically no air left between these two elements.

Therefore, the complete expulsion of air in contact with the scintillator is realized when the radon detector is not operative.

When, subsequently, the bellows 19 is opened or expanded by pulling handle 22, the volume of chamber 18 is increased and surrounding air is drawn in through the opening 23 and filtered by filter 24; the counting of alpha particles in said air is then started again.

An apparatus as described has numerous advantages and in particular the following.

In the non operative position, only traces of radon are left opposite the detecting surface 1 and these have no influence on the subsequent radioactivity measurement, so that all risks of systematic involuntary error in this measurement are removed.

The air is entirely renewed between two successive measurements, which makes each of these absolutely independent of the preceding one.

In the fully collapsed condition of the bellows, the chamber 18 has a well defined volume, and this enables each quantity of air used in the measurement to be perfectly well determined.

If the chamber 18 is opaque to light photons (which may be the case if the material used for the bellow 19 is chlorinated butadiene, and if the filter 24 is opaque by construction), it is possible to dispense with the film or sheet of aluminium on the surface 1, said film having the object of preventing light photons to reach the photo-multiplier), or at least to replace this film by a thinner layer (for example with a thickness of about 6 microns only) of a corrosion resistant plastic material, such as polyethylene glycol terephthalate, known under the trade mark "Mylar," this layer being preferably metallized to increase the scintillator output, the opacity of this metallization being then no more absolutely necessary.

The air admitted in chamber 18 is cleaned in the filter 24, which prevents pollution of the apparatus by deposit of radio-active dust on the internal walls of said chamber and on the detecting surface, which pollution would be liable to increase the background noise of the apparatus; the apparatus can be readily protected, for example against the running water in a mine, during transport thereof, by a sealed closure of the filter 24 by means of a suitable cover, and this sealing is still very effective during the operation of the apparatus.

The manipulation of the apparatus is particularly simple, it being only required to push and pull the plunger 22 to respectively put the apparatus in the "rest" and "operational" positions; it is also possible to arrange for an automatic operation by synchronizing the measuring period and the opening period of the bellows, the closure of the latter being automatically operated a determined time period after the moment of opening.

The scintillating element, which is generally fragile, is well protected mechanically against external shocks.

As an illustration, the graph in FIGURE 4 gives a standard example of calibration of a radon detecting apparatus of the type illustrated in FIGURE 2, the plug 3 being not covered by a plastic layer 16.

On this graph the numbers of pulses per minute recorded by the counter 6 were plotted and against the times in hours. The detector is first placed in the dark, the sponge rubber plug being placed in front of the light conduit. The counter then indicates an activity of 27+5 pulses per minute. This is the background noise due to the radon previously absorbed by the plug and to the inherent counts of the photo-multiplier.

At zero time, and still in the dark, the plug of sponge rubber is removed for one minute, the activity of the surrounding air being 10 tolerance doses, i.e. $10^{-9}$ curies per liter (which value may be determined by means of any known suitable method). 357 pulses were counted during this minute, i.e. when deducting the background noise, 330 pulses due solely to the radio activity of the air. This corresponds, for the detector, to $33\pm$ pulses per minute for each tolerance dose.

The rubber plug being placed back at the end of one minute, there has been traced, point by point, on FIGURE 4, the curve 17 representing the decrease in activity of the aluminum film and of the rubber plug; this curve is identical to that of a residual active deposit of radon. This curve 17 enables to determine the time period required between two measuring operations, for obtaining a given precision.

In the example described, the radon detector, forming the subject of the invention, is devised for a range of concentrations from 1 to 30 maximum permissible doses, i.e. $10^{-10}$ curies per liter to $3 \times 10^{-9}$ curies per liter. Assuming a method in which an average of three measurements per hour is carried out, the apparatus is self-sufficient for three months without new charge of the battery thereof.

The radon detector which forms the subject for this invention also enables the detection, for safety purposes, of any other gas which emits alpha particles (such, for example, as thorium) and even of any suspension of aerosols emitting alpha particles (as uranium salts or oxides).

We claim:

1. Portable apparatus for fast on-the-spot determination of the radon content of an atmosphere, comprising a variable-volume chamber including a stationary wall formed by a detecting element capable of emitting light scintillations in response to alpha particles, the other walls of the chamber being constituted by a rigid plate having substantially the same surface area as said stationary wall and by bellows having a first extremity thereof sealed around said rigid plate and a second extremity thereof sealed around a support for said stationary wall, said rigid plate and said bellows being made in a light-opaque material, said plate being pierced by a passage and said chamber being adapted to receive, when expanded, a predetermined volume of said atmosphere through said passage; means for expanding said chamber and for reducing the volume thereof substantially to zero to exhaust substantially completely said volume; photomultiplier means transforming the scintillations of said detecting element in detectable electron bursts; transistorized electronical means for supplying said photomultiplier means with electric power and for transforming said electron bursts thereof in electric pulses; means for counting said pulses; and electrical time-switching means automatically starting said counting means when said means for expanding said chamber are operated and cutting off said counting means after a counting period of about 30 to 60 seconds.

2. Radon detecting apparatus as claimed in claim 1 and comprising a dust filter covering said passage.

3. Radon detecting apparatus as claimed in claim 2 in which the said bellows is formed of chlorinated butadiene and the said dust filter is formed of corrugated paper.

4. Apparatus for fast on-the-spot determination of the radon content of an atmosphere, comprising a variable-volume chamber, including a stationary wall formed by a plate of polymethyl methacrylate covered by a thin layer of zinc sulphide, said layer of zinc sulphide being covered by very thin protective shield film and emitting light scintillations in response to alpha particles, the other walls of the chamber being constituted by a rigid plate having substantially the same surface area as said stationary wall and by bellows having a first extremity thereof sealed around said rigid plate and a second extremity thereof sealed around a support for said plate of polymethyl methacrylate, said rigid plate and said bellows being made in a light-opaque material, said plate being pierced by a passage and said chamber being adapted to receive, when expended, a predetermined volume of said atmosphere through said passage; a dust filter covering said passage; means for expanding said chamber and for reducing the volume thereof substantially to zero to exhaust substantially completely said volume; photomultiplier means transforming the scintillations of said detecting element in detectable electron bursts; transistorized electronical means for supplying said photomultiplier means with electric power and for transforming said electron bursts thereof in electric pulses; means for counting said pulses; and electrical time-switching means starting said counting means when said means for expanding said chamber are operated and automatically cutting off said counting means after a counting period of about 30 to 60 seconds.

5. Apparatus as claimed in claim 4, wherein said protective shield film is constituted by a film of metallized corrosion resistant plastic.

References Cited in the file of this patent

UNITED STATES PATENTS

| | | |
|---|---|---|
| 2,340,967 | Langer | Feb. 8, 1944 |
| 2,740,050 | Schultz | Mar. 27, 1956 |
| 2,772,368 | Scherbatskoy | Nov. 27, 1956 |
| 2,860,254 | Hendee | Nov. 11, 1958 |
| 2,892,091 | Sawle | June 13, 1959 |

FOREIGN PATENTS

| | | |
|---|---|---|
| 724,441 | Great Britain | Feb. 23, 1955 |

OTHER REFERENCES

Scintillation Counter for Assay of Radon Gas, by Van Dilla, et al., Nucleonics, February 1955, pp. 68–69.

Large, Sensitive, Area Portable Alpha Monitor, by Ryder et al., Nucleonics, July 1957, page 82.